US008708539B2

(12) United States Patent
Ugajin

(10) Patent No.: US 8,708,539 B2
(45) Date of Patent: Apr. 29, 2014

(54) VEHICULAR LAMP

(75) Inventor: Yuta Ugajin, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 8 days.

(21) Appl. No.: 13/556,727

(22) Filed: Jul. 24, 2012

(65) Prior Publication Data

US 2013/0027961 A1 Jan. 31, 2013

(30) Foreign Application Priority Data

Jul. 26, 2011 (JP) ................................ 2011-163029

(51) Int. Cl.
*B60Q 1/04* (2006.01)
*F21V 5/00* (2006.01)

(52) U.S. Cl.
USPC ............................ 362/522; 362/507; 362/538

(58) Field of Classification Search
USPC ................................. 362/507, 522, 309, 538
See application file for complete search history.

(56) References Cited

U.S. PATENT DOCUMENTS

| | | | | |
|---|---|---|---|---|
| 6,575,610 | B2 * | 6/2003 | Natsume | 362/520 |
| 7,410,279 | B2 * | 8/2008 | Kawashima et al. | 362/507 |
| 7,699,513 | B2 * | 4/2010 | Nakada et al. | 362/538 |
| 2011/0249460 | A1 * | 10/2011 | Kushimoto | 362/510 |

FOREIGN PATENT DOCUMENTS

JP 2008-300154 A 12/2008

OTHER PUBLICATIONS

English abstract of Japanese Publication No. 2008-300154 published Dec. 11, 2008, 1 page.

* cited by examiner

*Primary Examiner* — Peggy A. Neils
(74) *Attorney, Agent, or Firm* — Osha Liang LLP

(57) ABSTRACT

A vehicular lamp is provided with a light source and a projector lens. An incidence plane of the projector lens includes a first light distribution control surface configured to form a first light distribution pattern and a second light distribution control surface configured to form a second light distribution pattern which is formed above the first light distribution pattern.

3 Claims, 6 Drawing Sheets

VEHICULAR LAMP

BACKGROUND OF THE INVENTION

1. Field of the Invention

The present invention relates to a vehicular lamp.

2. Related Art

There is a vehicular lamp in which an outer casing is composed of a cover and a lamp housing and a lamp unit having a light source is mounted in the outer casing.

JP-A-2008-300154 discloses a lamp unit which includes a projector lens for projecting light emitted from a light source toward a front and a reflector for reflecting the light emitted from the light source toward the front.

In the vehicular lamp of JP-A-2008-300154, the light incident on the projector lens without being reflected by the reflector forms a light distribution pattern for low beam and the light reflected by the reflector forms a light distribution pattern for overhead sign light above the low beam. A visibility of objects such as a traffic sign placed above an irradiation region of the low beam is improved by the light distribution pattern for overhead sign light.

However, in the vehicular lamp of JP-A-2008-300154, a reflector which is a dedicated member for forming the light distribution pattern for overhead sign light is provided in addition to the projector lens. Accordingly, a number of parts is increased and therefore there is a problem that a manufacturing cost increases and a compactness is compromised.

SUMMARY OF THE INVENTION

One or more embodiments of the invention relate to a vehicular lamp capable of forming a plurality of desired light distribution patterns while reducing a number of parts and realizing compactness.

DETAILED DESCRIPTION OF THE EMBODIMENTS

A vehicular lamp according to an exemplary embodiment will be described by referring to the accompanying drawings (see, FIGS. 1 to 6).

According to an embodiment, the vehicular lamp 1 is a headlamp. The vehicular headlamp is mounted on each of left and right ends of a vehicle body.

Figure 1:
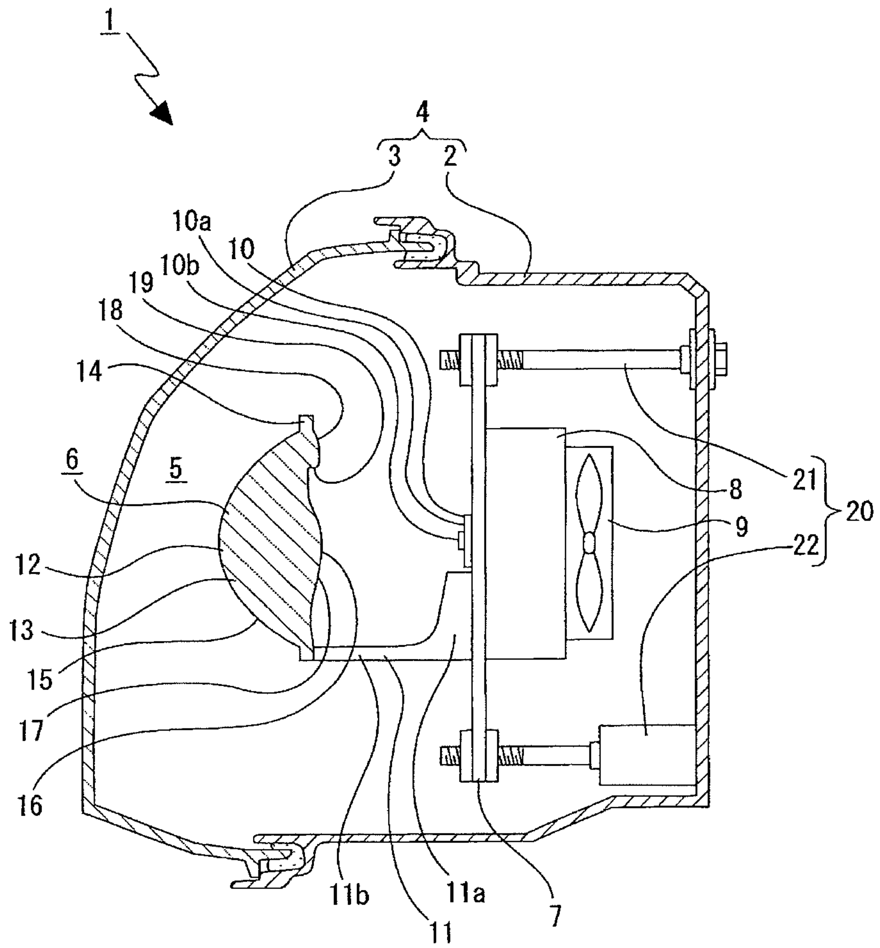
FIG. 1 is a schematic vertical cross-sectional view illustrating a vehicular lamp according to an exemplary embodiment.

As illustrated in FIG. 1, the vehicular lamp 1 includes an outer casing 4 composed of a lamp housing 2 opening toward a front and a cover 3 mounted on a front end of the lamp housing 2. An interior of the outer casing 4 is defined as a lamp chamber 5. A lamp unit 6 is placed in the lamp chamber 5.

Figure 2:
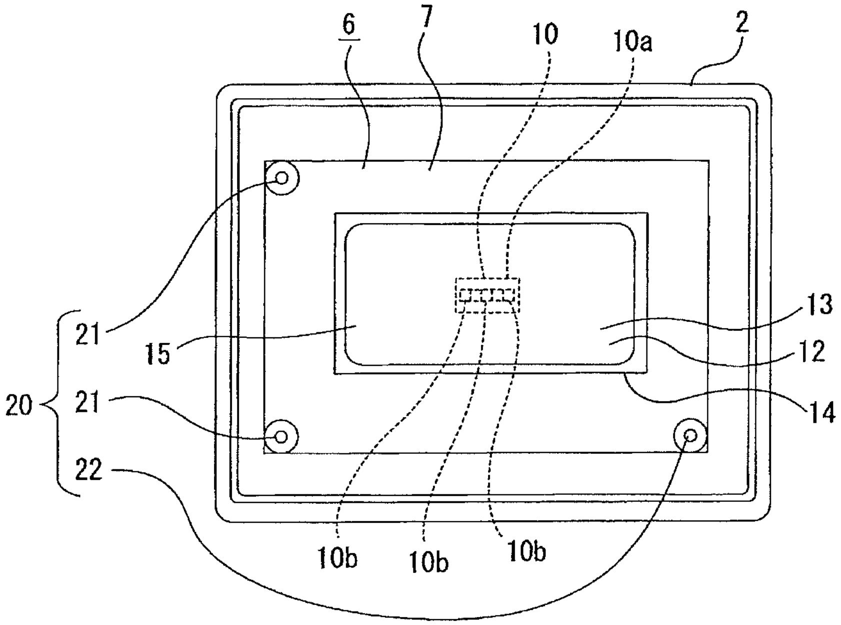
FIG. 2 is a schematic front view illustrating the vehicular lamp in a state where a cover is removed.

The lamp unit 6 includes a holding member 7, heat radiating fins 8, 8, . . . , a heat radiation fan 9, a light source body 10, a mounting member 11 and a projector lens 12 (see, FIGS. 1 and 2).

The holding member 7 is formed in a flat-plate shape facing toward a front-rear direction.

The heat radiating fins 8, 8, . . . are provided on a rear surface of the holding member 7 while being spaced away from each other in a lateral direction.

The heat radiation fan 9 is mounted on a rear surface of the heat radiating fins 8, 8, . . . .

The light source body 10 is mounted on a central portion of a front surface of the holding member 7. The light source body 10 includes a circuit board 10*a* and a plurality of semiconductor light emitting elements 10*b*, 10*b*, . . . . The circuit board 10*a* is mounted on the holding member 7 and faces toward the front-rear direction. The semiconductor light emitting elements 10*b*, 10*b*, . . . are mounted on the circuit board 10*a* and serves as a light source.

For example, LED (Light Emitting Diode) is employed as the semiconductor light emitting elements 10*b*, 10*b*, . . . . The semiconductor light emitting elements 10*b*, 10*b*, . . . are arranged side-by-side in a lateral direction with a light emitting surface facing toward the front (see, FIG. 2).

The mounting member 11 is mounted on a portion of the front surface of the holding member 7 located below the light source body 10 (see, FIG. 1). The mounting member 11 is made by integrally forming a base portion 11*a* mounted on the holding member 7 and a lens holding portion 11*b* protruding forward from a lower end of the base portion 11*a*.

The projector lens 12 is mounted on a front end of the lens holding portion 11*b* of the mounting member 11. The projector lens 12 is made by integrally forming a lens portion 13 and a flange portion 14 protruding outward from an outer periphery of the lens portion 13.

The lens portion 13 is formed in a transversely long shape (see, FIGS. 2 and 3) and includes an emitting plane 15 formed in a curved shape which is convex toward the front. In this lens portion 13, a portion other than an upper end portion of an incidence plane 16 is formed as a first light distribution control surface 17 and the upper end portion of the incidence plane 16 is formed as a second light distribution control surface 18 (see, FIGS. 1 and 3). The first light distribution control surface 17 is a control surface for forming a first light distribution pattern of low beam and the first light distribution is adapted to irradiate a short-range region. The second light distribution control surface 18 is a control surface for forming a second light distribution pattern of overhead sign light and the second light distribution pattern is adapted to irradiate an upper region in which objects such as a traffic sign are present. Accordingly, the second light distribution pattern P2 of overhead sign light is formed above the first light distribution pattern P1 of low beam.

A stepped surface 19 facing downward is provided between the first light distribution control surface 17 and the second light distribution control surface 18. Both front and rear ends of the stepped surface 19 are continuously connected to an upper edge of the first light distribution control surface 17 and a lower edge of the second light distribution control surface 18, respectively (see, FIG. 1).

Figure 3:
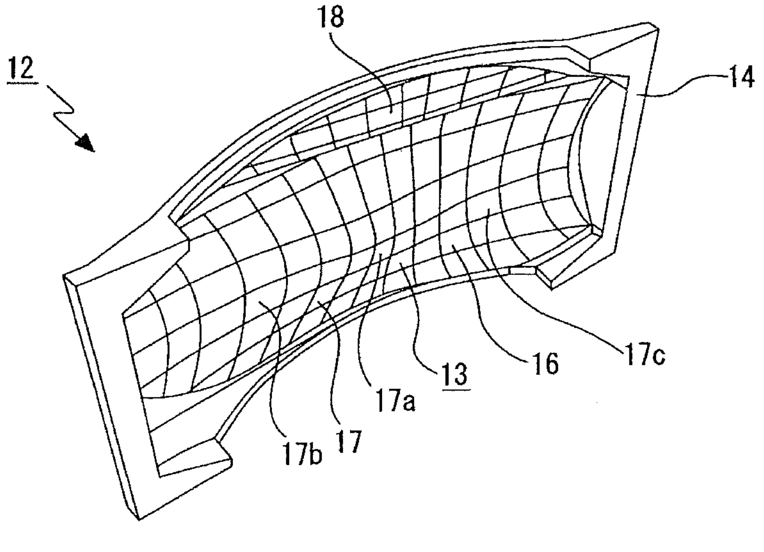
FIG. 3 is a perspective view of a projector lens.
Figure 4:
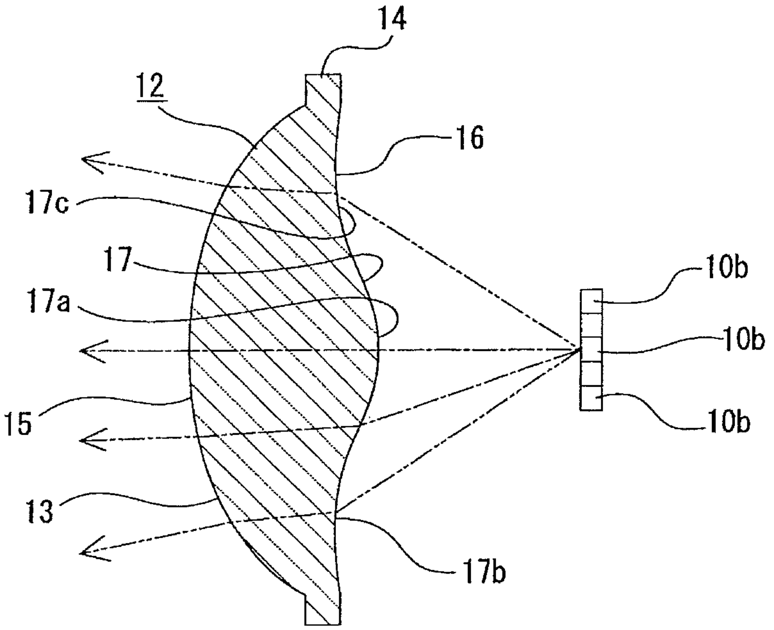
FIG. 4 is a schematic plan view illustrating an optical path of light emitted from a light source.
Figure 5:
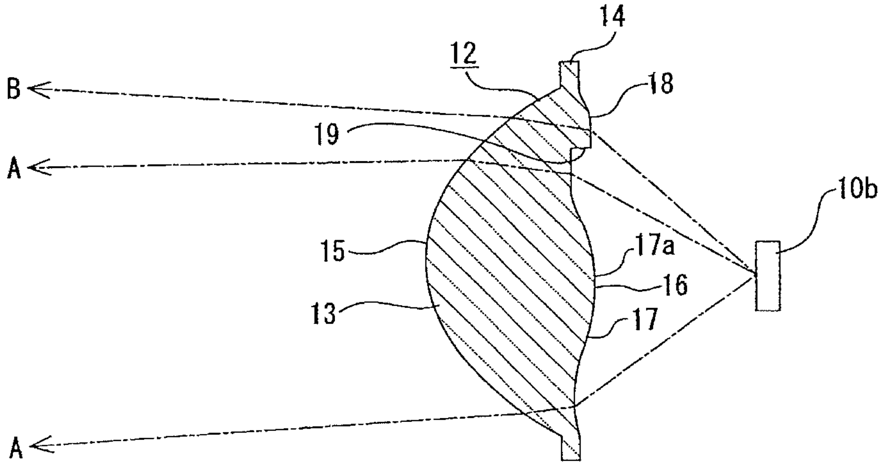
FIG. 5 is a schematic side view illustrating the optical path of light emitted from a light source.
Figure 6:
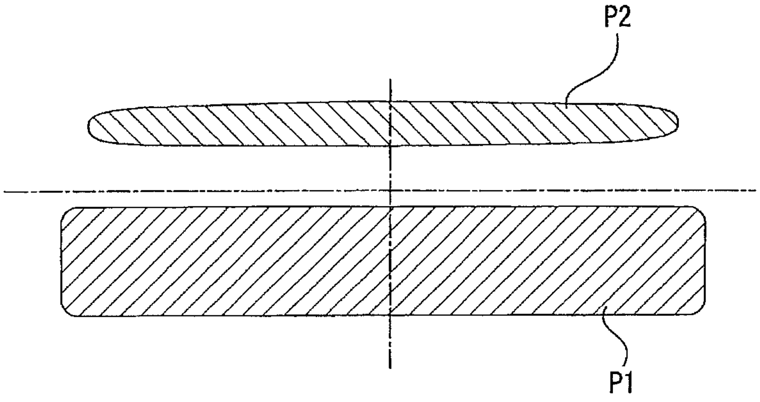
FIG. 6 is a view illustrating the light distribution patterns.

The first light distribution control surface 17 is so configured that a central portion thereof is formed as a first light incoming plane 17*a* which is shaped in a smooth curve being convex toward the rear in a horizontal sectional shape and a vertical sectional shape (see, FIGS. 3 to 5). Further, it should be noted that the grid lines provided in the incidence plane 16 of FIG. 3 are indicated only for the purpose of easily understanding the surface shape of the incidence plane 16 but actually are not provided on the incidence plane 16.

The first light distribution control surface 17 is so configured that both left and right portions of the first light incoming plane 17*a* are respectively formed as a second light incoming plane 17*b* and a third light incoming plane 17*c* which are shaped in a smooth curve being concave toward the rear in a horizontal sectional shape (see, FIG. 4). The second light incoming plane 17*b* is formed in a smooth curved shape being convex toward the rear in a vertical sectional shape and the third light incoming plane 17*c* is formed in a smooth curved shape which is concave toward the rear in a vertical sectional shape (see, FIG. 3).

The second light distribution control surface 18 is formed in a smooth curved shape which is convex toward the rear (see, FIGS. 1 and 3).

The lamp unit 6 can be swung relative to the outer casing 4 in the vertical direction and the lateral direction via an optical axis adjusting mechanism 20.

The optical axis adjusting mechanism 20 includes aiming screws 21, 21 and a leveling actuator 22. The aiming screws 21, 21 respectively extend in the front-rear direction and are respectively screwed and connected to a predetermined position of the holding member 7 while being rotatably supported on a rear end of the lamp housing 2.

The leveling actuator 22 is mounted on an inner surface of a lower end portion of the lamp housing 2 and a front end thereof is screwed and connected to a predetermined position of the holding member 7.

In the vehicular lamp 1, when the aiming screw 21 is rotated, the lamp unit 6 is tilted relative to the outer casing 4 in a vertical and/or lateral direction to carry out aiming adjustment. When leveling actuator 22 is operated, the lamp unit 6 is swung relative to the outer casing 4 in a vertical direction to carry out leveling adjustment.

In the vehicular lamp 1 thus configured, when a drive voltage is applied from a lighting control circuit (not-illustrated) to the light source body 10, light is emitted from the semiconductor light emitting elements 10*b*, 10*b*, . . . . The emitted light is incident on the first light distribution control surface 17 or the second light distribution control surface 18 in the incidence plane 16 of the projector lens 12.

As illustrated in FIG. 5, the light incident from the semiconductor light emitting elements 10*b*, 10*b*, . . . on the first light distribution control surface 17 becomes substantially parallel light and is irradiated as low beam A toward the front. The first light distribution pattern P1 is formed by the light incident on and projecting from the first light distribution control surface 17 (see, FIG. 6). At this time, the light incident from the first incoming plane 17*a* of the first light distribution control surface 17 is focused and irradiated toward the front (see, FIG. 4). Further, the light incident from the second incoming plane 17*b* is irradiated toward the front while being diffused in a lateral direction and focused in a vertical direction. Further, the light incident from the third incoming plane 17*c* is irradiated toward the front while being diffused in lateral and vertical directions.

As described above, the vehicular lamp 1 is so configured that the first light distribution control surface 17 is provided with the first light incoming plane 17*a* which is convex toward the rear (that is, toward the semiconductor light emitting elements 10*b*, 10*b*, . . . ) and the second light incoming plane 17*b* which is convex toward the rear in a vertical sectional shape.

Accordingly, since the light incident on the first light incoming plane 17*a* and the second light incoming plane 17*b* which are convex toward the rear is focused and irradiated, the irradiated light and the other light are hardly interfered with each other. Consequently, it is possible to control the light distribution in high definition when forming the first light distribution pattern P1.

Meanwhile, the light incident from the semiconductor light emitting elements 10*b*, 10*b*, . . . on the second light distribution control surface 18 is inclined upward and forward and thus irradiated as a overhead sign light B above the low beam A, as illustrated in FIG. 5. The second light distribution pattern P2 is formed by the light incident on and projecting from the second light distribution control surface 18 (see, FIG. 6).

As described above, the vehicular lamp 1 is so configured that the first light distribution control surface 17 for forming the first light distribution pattern P1 and the second light distribution control surface 18 for forming the second light distribution pattern P2 are provided on the incidence plane 16 of the projector lens 12 and the second light distribution pattern is located above the first light distribution pattern.

Accordingly, since the first light distribution pattern P1 and the second light distribution pattern P2 arranged in a vertical direction are formed by the light incident on the projector lens 12, it is not necessary to provide a dedicated member such as a reflector for forming a plurality of light distribution patterns. Consequently, it is possible to form a plurality of desired light distribution patterns while reducing the number of parts and realizing compactness.

Further, although the light distribution pattern for low beam is formed as the first light distribution pattern P1 and the light distribution pattern for overhead sign light is formed as the second light distribution pattern P2 in the foregoing embodiment, another patterns may be utilized as the first light distribution pattern P1 and the second light distribution pattern P2 as long as they are arranged in a vertical direction.

Further, the vehicular lamp of the present invention is not limited to a vehicular headlamp. For example, the vehicular lamp of the present invention may be applied to another vehicular lamp such as a cornering lamp which irradiates light on the turned sides when a vehicle is turning in left and right direction during driving, thereby improving the visibility.

The shapes and structures of the respective portions described above are merely examples for carrying out embodiments of the present invention. While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

In accordance with the above embodiments, a vehicular lamp 1 may include a light source 10, and a projector lens 12 adapted to project and irradiating the light emitted from the light source 10. An incidence plane 16 of the projector lens 12 may include a first light distribution control surface 17 configured to form a first light distribution pattern and a second light distribution control surface 18 configured to form a second light distribution pattern which is formed above the first light distribution pattern.

According to this structure, since the first light distribution pattern and the second light distribution pattern arranged in a vertical direction are formed by the light incident on the projector lens, it is not necessary to provide a dedicated member such as a reflector for forming a plurality of light distribution patterns. Consequently, it is possible to form a plurality of desired light distribution patterns while reducing the number of parts and realizing compactness.

In the above structure, the first light distribution control surface 17 may include a light incoming plane 17*a* which is convex toward the light source 10.

According to this structure, since the light incident on the light incoming plane which is convex toward the light source is focused and irradiated, the irradiated light and the other light are hardly interfered with each other. Consequently, it is possible to control the light distribution in high definition when forming the first light distribution pattern.

In the above structure, the incident plane 16 of the projector lens 12 may further include a stepped surface 19 between the first light distribution control surface 17 and the second light distribution control surface 18, and a front end of the stepped surface 19 may be continuously connected to an upper edge of the first light distribution control surface 17, and a rear end of the stepped surface 19 may be continuously connected to a lower edge of the second light distribution control surface 18. The stepped surface 19 may substantially extend in a horizontal plane.

What is claimed is:

1. A vehicular lamp comprising:

a light source; and a projector lens adapted to project and irradiating the light emitted from the light source, wherein an incidence plane of the projector lens includes a first light distribution control surface configured to form a first light distribution pattern and a second light distribution control surface configured to form a second light distribution pattern which is formed above the first light distribution pattern, wherein the incident plane of the projector lens further includes a stepped surface between the first light distribution control surface and the second light distribution control surface, wherein a front end of the stepped surface is continuously connected to an upper edge of the first light distribution control surface, and wherein a rear end of the stepped surface is continuously connected to a lower edge of the second light distribution control surface.

2. The vehicular lamp according to claim 1, wherein the first light distribution control surface includes a light incoming plane which is convex toward the light source.

3. The vehicular lamp according to claim 1, wherein the stepped surface substantially extends in a horizontal plane.

* * * * *